March 17, 1925.

A. STUBER 1,530,218

FLUID SUPPLY APPARATUS

Filed Jan. 31, 1921

INVENTOR.
Adolph Stuber.
BY Frederick S. Church
his ATTORNEY.

Patented Mar. 17, 1925.

1,530,218

UNITED STATES PATENT OFFICE.

ADOLPH STUBER, OF ROCHESTER, NEW YORK.

FLUID-SUPPLY APPARATUS.

Application filed January 31, 1921. Serial No. 441,287.

*To all whom it may concern:*

Be it known that I, ADOLPH STUBER, a citizen of the United States, residing at Rochester, in the county of Monroe and State of New York, have invented certain new and useful Improvements in Fluid-Supply Apparatus; and I do hereby declare the following to be a full, clear, and exact description of the same, reference being had to the accompanying drawing, forming a part of this specification, and to the reference numerals marked thereon.

This invention has to do with fluid supply apparatus and relates more particularly to the variety adapted for supplying fluid fuel to internal combustion motors, the chief object of the invention being to provide a simple, practical and efficient apparatus of the above character, for supplying fluid in units of accurately predetermined size, so that the apparatus may serve also as a measuring means for use in conjunction with mechanism for registering the fuel consumption. To these and other ends the invention consists in certain improvements and combinations of parts, all as will be hereinafter more fully described, the novel features being pointed out in the claims at the end of the specification.

In the drawings.

Similar reference characters throughout the several views indicate the same parts.

Figure 1:
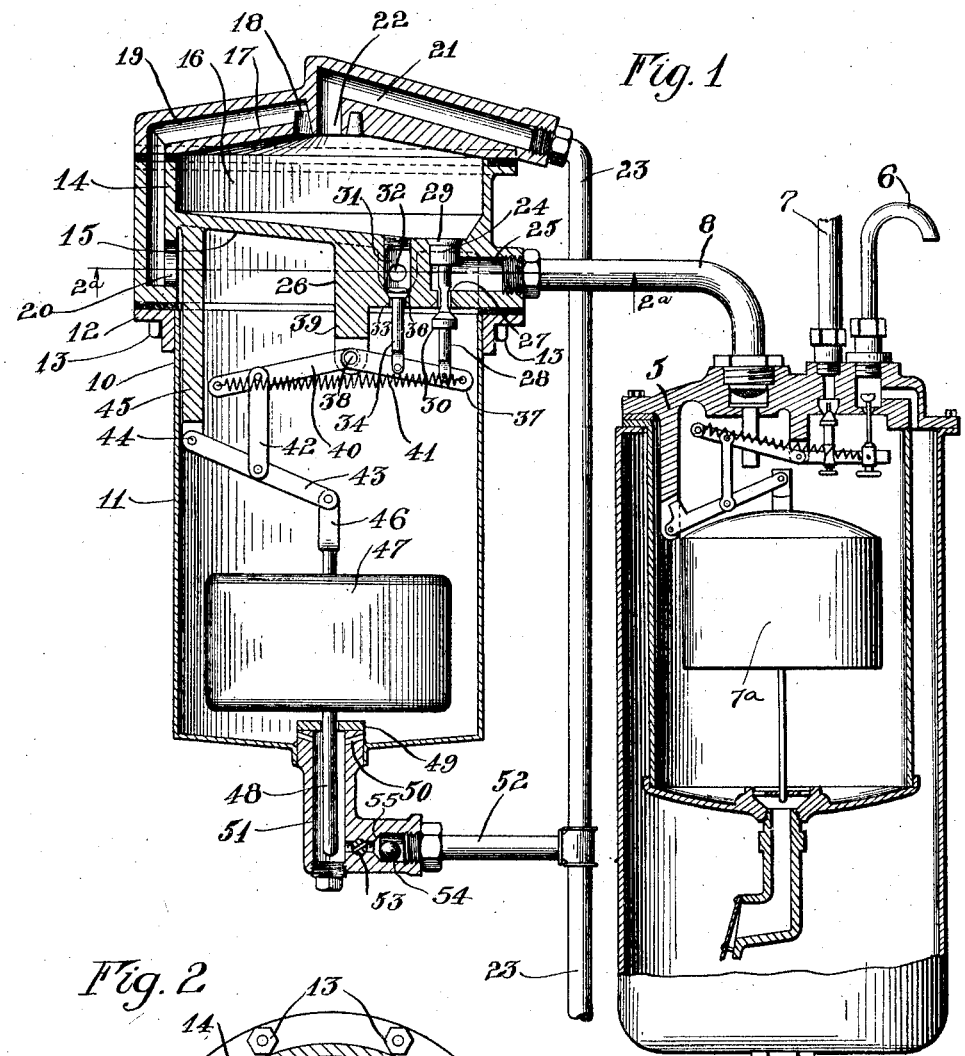
Figure 1 is a side elevation partly in central section of a portion of a fluid supply apparatus having the invention applied thereto.

For the purpose of operating mechanism for registering the fuel consumption of an internal combustion motor, such as disclosed in my copending application Serial No. 200,261, filed November 5, 1917 for "Registering mechanisms," it has been found convenient to employ a portion of the fuel supply system as a measuring means or meter. A common form of supply system includes an auxiliary tank, such, for example, as is commonly found on the dash board of motor vehicles, which is connected with the main supply tank and with the motor carburetor, and alternately filled and emptied to supply the latter. Such an auxiliary tank is disclosed in my co-pending application for patent on fluid supply systems, Serial No. 441,286, filed Jan. 31, 1921. It has been found, however, that such tanks, of the same size and type, vary in the size of the successive units supplied, and furthermore that the successive operations of any one such tank may vary due to vibrations in the apparatus, especially in the case of a motor vehicle on a comparatively rough roadway.

It is an object of the present invention to overcome these difficulties in the use of such auxiliary tanks as fluid measuring means, this invention being in the nature of an improvement on the apparatus disclosed in my co-pending application for patent on fluid measuring apparatus, Serial No. 306,976, filed June 26, 1919. The apparatus disclosed in the latter application comprises a special auxiliary tank having a measuring chamber therein adapted to supply fluid in accurately measured units, whereas the present invention provides apparatus for the same purpose in the nature of an attachment for auxiliary tanks already installed, so that they may be continued in use and adapted to supply fluid in accurately measured units for the purpose stated. The embodiment of the invention selected for the purposes of the present disclosure, however, is intended merely by way of illustration of the principles involved, and a preferred practical application thereof, and is of course, capable of various modifications within the scope of the invention.

Referring to the drawing, there is shown at 5 an auxiliary tank such as is shown and described in detail in my said application, No. 441,286 and as this device is well known in the art, a detailed description herein appears unnecessary further than to state for present convenience that tank 5 is of the so-called vacuum type, provided with an atmospheric connection 6, a vacuum or reduced pressure connection 7 leading to the motor intake, and a fluid supply or intake connection 8, while at 9 is shown the discharge connection leading to the motor carburetor. Pipes 6 and 7 are provided with valves as shown, and a float 7ª cooperating with the fluid level in the tank actuates the valves by a well known form of linkage such as described hereafter in connection with the mechanism of container 10 to close pipe 6 and open pipe 7 when the tank becomes empty to draw in a supply of fluid through pipe 8 and to reverse the valves when the tank is filled to allow the contents to flow out to the carburetor through pipe 9.

Figure 2:
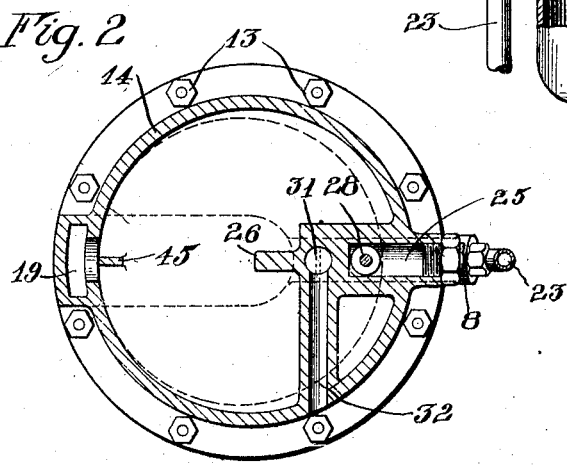
Figure 2 is a section on the line 2ª—2ª of Figure 1, looking in the direction of the arrows.

In combination with a tank of the above type there is provided a container indicated generally at 10, comprising, preferably, a lower receptacle 11 carrying adjacent its top a flange 12 on which is secured as by means of bolts 13, Figure 2, the flange of an upper portion 14 having a bottom wall 15 serving to close the top of the receptacle 11 and to form with the portion 14 a measuring chamber 16. Integral with or fixed on the top of portion 14, in any suitable manner, is a cover 17 having formed adjacent its center an overflow opening 18 for the measuring chamber 16, connected by means of a downwardly extending channel 19 formed in the portions 14 and 17 with an opening 20 communicating with the top of receptacle 11. The channel or connection 19 thus forms in conjunction with the opening 18 an overflow connection between the measuring chamber and receptacle, so that when the former is filled the surplus fluid then flows directly into the receptacle. Cover portion 17 has formed therein also a channel or connection 21 discharging through an opening 22 into the measuring chamber and having connected with its other end a pipe 23 leading to a main fluid supply tank of any suitable construction, so that when a pressure sufficiently reduced below that of the atmosphere is established in the measuring chamber and receptacle, by means presently to be described, fluid is drawn through pipe 23 and discharged into the measuring chamber and thence into the receptacle, as long as such difference in pressure is maintained.

The bottom wall 15 of the measuring chamber is preferably dished as shown toward one side to facilitate drainage, and at its low portion is provided with a passage or opening 24 leading into an opening 25 formed in a housing 26 depending from the wall 15. Connected with opening 25 is the pipe 8 forming the fluid supply connection for the auxiliary tank. Opening also into the connection 25 is a passage 27 through which extends, in sliding relation, a valve stem 28 projecting also adjacent the passage 24 and having fixed on its end in the latter passage a valve body 29 cooperating with a seat formed at the upper end of the passage for closing the latter upon downward movement. Valve stem 28 is reduced in size where it passes through passage 27, to provide a pressure transmitting clearance, and at the lower end of such reduced portion there is formed on the stem a valve 30 cooperating with a seat at the lower end of passage 27, to close the latter on upward movement. It is to be noted from this construction that valve stem 28 may be moved upwardly to close the pressure transmitting passage 27 and simultaneously open the fluid transmitting passage 24 thereby shutting off the communication between pipe 8 and the receptacle and connecting the pipe with the measuring chamber. Downward movement of the valve stem reverses these connections.

Formed in the housing 26 is an opening 31 connected by means of a channel 32, as shown in Figure 2, with the atmosphere, the upper end of the opening 31 being extended, for constructional purposes, through the wall 15 and sealed by means of a screw plug or other suitable closure. Opening 31 has at its lower end a reduced opening or passage 33 communicating with the receptacle 11, and sliding in this opening is a valve stem 34 smaller than the opening to permit the transmission of pressure through the latter, and the valve stem has fixed on its upper end a valve body 36 cooperating with a seat at the upper end of passage 33. It is apparent that upward movement of stem 34 establishes atmospheric connection with the receptacle and through channel 19 with the measuring chamber and pipe 23 leading to the main supply tank, whereas downward movement of the stem shuts off such connection.

The lower ends of valve stems 28 and 34 are preferably pivotally connected to an arm 37 pivotally supported in turn at 38 on a depending lug 39 on housing 26, at which point is also pivotally supported an arm 40, the outer end of which is connected by means of a spring 41 with the outer end of arm 37. Pivotally connected with arm 40 is a link 42 pivoted at its lower end on an arm 43 which is pivotally supported at 44 on a lug 45 depending from wall 15. Arm 43 is pivotally connected at its outer end with a rod 46 carried by a float 47 cooperating with the fluid in receptacle 11. Float 47 has fixed in its bottom a guide rod 48 sliding in an opening in a plate 49 fixed on the upper end of an elbow 51 carried by the bottom of the receptacle, by which means the float is guided to rise and fall vertically with the fluid level. As well understood in the art, spring 41 serves to snap the arms 37 and 40 past the parallel or central position and thus insures quick and full movement of the valves from one extreme position to the other. Elbow 51 communicates at its upper end through an opening or openings 50 of comparatively small area with the bottom of the receptacle, and at its other end with a pipe 52 leading to the fluid supply pipe 23, thereby forming a drainage connection between the receptacle and the main supply tank. This connection is preferably provided with a cock or valve 53 whereby the rate at which the receptacle is drained may be adjusted as found desirable, and with a ball check valve 54 cooperating with a seat 55 to prevent the flow of fluid upwardly into the receptacle.

It is apparent from the above described construction and arrangement of the float, and its actuating connections with the valves controlling passages 24, 27 and 33, that with the float in its lower position, as shown in the drawings, communication is cut off between the measuring chamber and the auxiliary tank, and also between the receptacle and the atmosphere, and opened between the auxiliary tank and the receptacle and therefore through passage 19 with the measuring chamber and fluid supply line 23. When the partial vacuum or reduced pressure of the motor intake is next established in the auxiliary tank, therefore, it is transmitted to the supply line and draws fluid from the main tank to fill the measuring chamber and thence overflow into the receptacle. When the fluid level in the latter rises and raises float 47, the positions of the valves are reversed, so that the drainage passage 24 of the measuring chamber is opened, the reduced pressure connection is closed and atmospheric connection established in container 10, and the fluid in the measuring chamber is allowed to drain into the auxiliary tank to operate the latter, the mechanism of which then shuts off connection with the engine manifold and opens communication with the atmosphere. In the meantime the fluid in receptacle 11 drains gradually back into the main tank so that float 47 falls and the valves are reversed ready for a repetition of the operation.

The operation of the apparatus has been described above in connection with the description of the parts and their functions. When the fluid is exhausted from the auxiliary tank through its connection with the carburetor, a reduced pressure or partial vacuum is established therein which is at once transmitted to the container 10 and supply line 23 so that fluid is drawn into the container to fill its measuring chamber and overflow into the receptacle. This operation is rapid and the rising of float 47 with the fluid level in the receptacle reverses the valves in the manner described, and relieves the partial vacuum by establishing atmospheric connection, thereby terminating the supply of fluid. At the same time the contents of the measuring chamber are drained into the auxiliary tank, filling the latter and resulting in the establishment of atmospheric pressure therein and the supply of fluid to the carburetor again. The contents of the receptacle subsequently drain back to the main tank, and the parts return to the position shown in the drawing, ready for a repetition of the operation.

It is apparent from this construction that at each operation of the apparatus the full contents of the measuring chamber, which has a suitable known capacity, is supplied to the auxiliary tank and to the motor. The size of the successive units thus supplied is in no way varied by vibrations of the apparatus. The overflow opening of the measuring chamber is designed to prevent any perceptible spilling of the contents due to vibration, and an accurately measured unit is thus fed at each operation or of the fluid levels therein and the resulting disturbance of the float actuating means. As apparent from the disclosure, the container 10 and its parts are simple and practical in construction and readily connected with auxiliary tanks already in use, so that the fluid supply system of an internal combustion motor of the general character described may be readily adapted to serve also as a metering or measuring apparatus for use in conjunction with apparatus for registering the consumption of fuel.

I claim as my invention:

1. In a fluid supply system, the combination of an auxiliary fluid tank having means for providing communication with the atmosphere and with a reduced pressure, a fluid measuring chamber communicating with said tank, a receptacle communicating with said chamber, means for connecting said chamber with a source of fluid supply, valves controlling the pressure in said tank and chamber and also the flow of fluid from the latter into said tank, and independently movable means controlled by the fluid levels in said tank and receptacle for alternately opening and closing said valves to supply measured quantities of fluid to said tank.

2. In a fluid supply system, the combination with a tank having means controlled by the fluid level therein for alternately connecting the same with the atmosphere and with a connection leading to a reduced pressure, of a fluid receptacle, a fluid measuring chamber having an overflow connection with said receptacle and a drainage passage leading to said tank, passages connecting said receptacle and chamber with the atmosphere and with said tank, actuating means controlled by the fluid level in said receptacle for controlling said passages, means for connecting said chamber with a supply of fluid, and a drainage connection leading from said receptacle to said supply connection.

3. In a fluid supply system, the combination with a tank having means controlled by the fluid level therein for alternately connecting the same with the atmosphere and with a connection leading to a reduced pressure, of a fluid receptacle, a fluid measuring chamber having an overflow connection with said receptacle and a drainage passage leading to said tank, a passage connecting said receptacle and chamber with the atmosphere, a connection between said receptacle and chamber and a reduced pressure, actuating means controlled by the fluid level in said receptacle for controlling said passages, means for connecting said chamber with a supply of fluid, and a drainage connection leading from said receptacle to said supply connection.

4. In a fluid supply system, the combination with a tank having means controlled by the fluid level therein for alternately connecting the same with the atmosphere and with a connection leading to a reduced pressure, of a fluid receptacle, a fluid measuring chamber having an overflow connection with said receptacle and a drainage passage leading to said tank, a passage connecting said receptacle and chamber with the atmosphere, a connection between said receptacle and chamber and a reduced pressure, means for connecting said chamber with a supply of fluid, a drainage connection leading from said receptacle to said supply connection, valves controlling said passages, and actuating means for said valves controlled by the fluid level in said receptacle for drawing fluid into said chamber and receptacle when a reduced pressure is established in said tank and subsequently draining said chamber and receptacle when the latter is filled.

5. In a fluid supply system, the combination with a tank having means controlled by the fluid level therein for alternately connecting the same with the atmosphere and with a connection leading to a reduced pressure, of a fluid receptacle, a fluid measuring chamber having an overflow connection with said receptacle, and a drainage passage leading to said tank, passages connecting said receptacle and chamber with the atmosphere and with said reduced pressure, means for connecting said chamber with a supply of fluid, a drainage connection leading from said receptacle to said supply connection, valves controlling said passages, and actuating means for said valves, including a float in said receptacle for drawing fluid into said chamber and receptacle when a reduced pressure is established in said tank and subsequently draining said chamber and receptacle when the latter is filled.

6. A regulating attachment for the auxiliary tank of vacuum fluid fuel feeding systems for internal combustion motors comprising a container having an upper fluid measuring chamber and means for connecting the same with said tank and a lower fluid receptacle connected by an overflow passage with said chamber, means for connecting said chamber with a source of fluid supply, valves controlling communication between said tank and chamber and between the latter and the atmosphere, and float means controlled by the fluid level in said receptacle for alternately opening and closing said valves to supply measured quantities of fluid to said tank.

ADOLPH STUBER.